Sept. 26, 1961  A. KÜCKENS  3,001,557
COFFEE DISPENSER RESPONSIVE TO PRESENCE OR ABSENCE OF A CUP
Filed Nov. 7, 1958  6 Sheets-Sheet 1

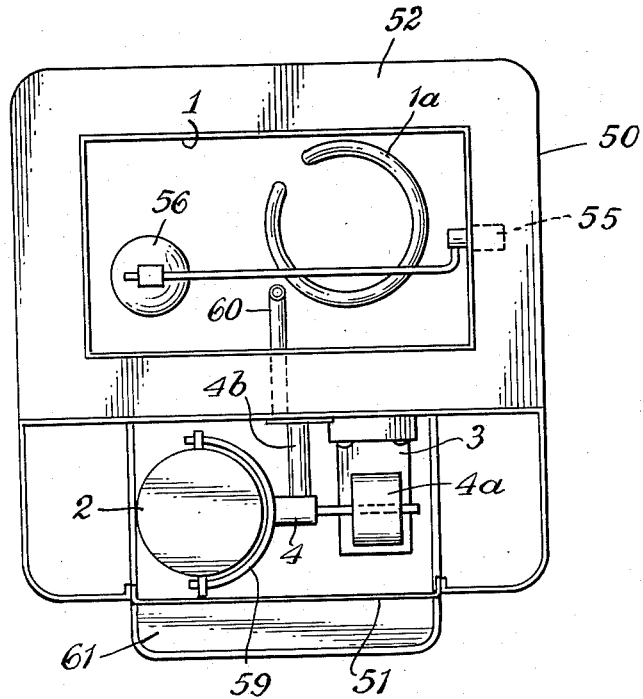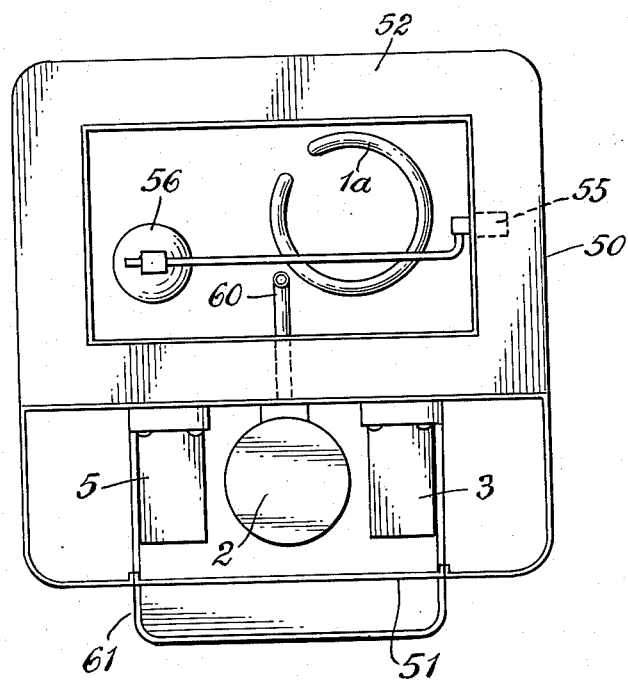

United States Patent Office 3,001,557
Patented Sept. 26, 1961

3,001,557
COFFEE DISPENSER RESPONSIVE TO PRESENCE OR ABSENCE OF A CUP
Alexander Kückens, Hamburg, Germany, assignor to Dagma & Co., G.m.b.H., Hamburg, Germany
Filed Nov. 7, 1958, Ser. No. 772,501
Claims priority, application Germany Nov. 14, 1957
1 Claim. (Cl. 141—94)

The invention relates to automatic coffee machines and particularly to a machine in which heated water is dispensed together with a predetermined amount of liquid coffee concentrate, either by discharging these two liquids into a mixing tube or into a container, such as a coffee cup.

It is one object of the invention to provide the coffee machine with an automatically operated signal device which indicates when the machine is empty, particularly when the amount of coffee concentrate has been exhausted. In many conventional coffee machines this "empty" signal is produced by an electro-counting device which also registers simultaneously the number of cups of coffee dispensed and after the coffee is used up indicates that the coffee container is empty.

These mechanical or electro-mechanical devices for measuring the cups of coffee dispensed requires large-sized automatic machines, the measuring is not precise, and in many instances the relation between the number of cups and the volume of coffee concentrate is such that a rest of coffee concentrate may remain in the coffee container, while no hot water for making a coffee beverage is available anymore.

The object of the present invention is to provide a small device in which the "empty" condition of the coffee machine is reliably indicated in a simple manner. Furthermore, the opening of the valves for discharging the liquid coffee concentrate and the heated water takes place without causing any wear of the timing device since the operation is controlled electronically.

In accordance with another object of the invention the control of the dispensing operation of the coffee concentrate and the heated water is controlled by an electromagnetic timing switch and a signal indicating "empty" is automatically operated by means of an electric switch.

The primary object of the present invention is directed towards replacement of the mechanically operated parts in the timing device by electronic pulses, so that any wear of mechanical parts is eliminated, thus eliminating the inaccuracies which lead to a faulty operation of the coffee machine.

In connection with coffee machines in general, the following feature is also important. Liquids such as coffee concentrates are susceptible to the formation of sediments in that, for instance, the insoluble suspended materials present in the liquid will slowly precipitate. Certain liquids are also exposed to the action of chemical changes, for instance, due to oxidation processes. These chemical processes may form solid ingredients which are apt to form deposits. In case liquids of this type are placed in a container from which the liquid is to be discharged, these deposits have to be held back by means of various methods, for instance, by screens or filters. Particular difficulties may arise when the liquid has to be directly dispensed from the container through small nozzles.

The suggestion to prevent the formation of said sediments by addition of stabilizing means or anti-oxidation means is, however, not very practical particularly in coffee concentrates to prevent the precipitation of tannate particles. The disadvantage of this suggestion is that the natural pure condition and flavor of the coffee concentrate will be impaired by the addition of chemical additives.

It is therefore another object of the invention to overcome in a simple manner these disadvantanges by placing a plastic body, for instance, made of a polymerisation plastic (resin) in the liquid container so that this plastic body is subjected to a static charge. If such a body or bodies are placed close to the discharge opening they will attract the particles suspended in the liquid and will thus prevent such particles from entering the discharge opening and producing there undesirable clogging and other difficulties in the discharge of the liquid. Such a static charge can be artificially increased or renewed, respectively, for instance, by friction. Polymerisation plastics such as, for instance, a plastic material known under the trademark "Plexiglas" can be advantageously used.

The invention will now be described on hand of three embodiments shown in the accompanying drawings, in which:

FIGS. 5 and 6 show plan views of the coffee machine shown in FIGS. 1 and 3, respectively;

Figure 1:
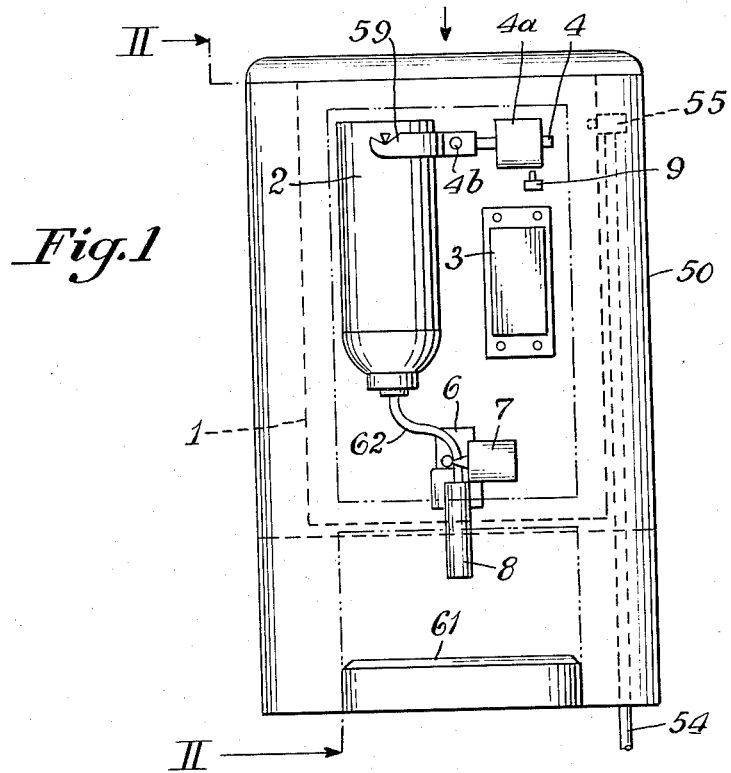
FIG. 1 shows a front elevation view of a coffee machine.

In the drawings, a cabinet of substantially the same structure is used in all three embodiments. It comprises a main enclosure 50 which at the front is open in its lower part as at 16 in FIG. 8, while the upper portion of the front opening is closed by a door 51.

A water tank 1 surrounded by a heavy layer of insulation 52 is mounted in the rear portion of the cabinet. The water tank may be open at the top or covered with a lid having a steam outlet 53, FIG. 8. The tank 1 is provided with an inlet pipe 54 provided with a valve 55 which is automatically controlled by a float 56 in a well known manner. An electric heating coil 1a is mounted in the water tank 1 and provided with projecting terminals 57, 58 for connection to a source of electric current. The front wall of the insulated water tank 1 serves as a support for various operating members as will now be described.

Figure 2:
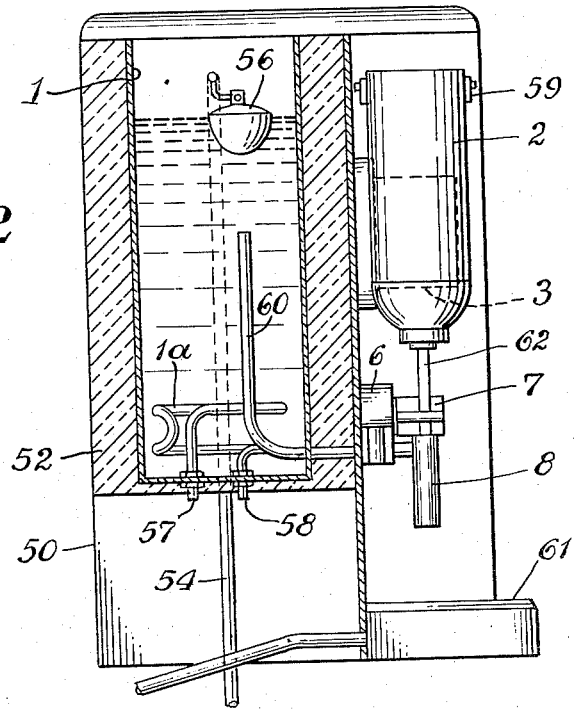
FIG. 2 shows a sectional view of the same along the line II—II of FIG. 1.

In the embodiment of FIGS. 1, 2, and 5 a lever 4 is pivotally supported on the front wall of the water tank at 4b. One end of the lever 4 is fork-shaped as at 59 and adapted to removably support an insulated container 2 for liquid coffee concentrate. On the other end of the lever 4 a counterweight 4a is adjustably mounted. Stop means (not shown) are provided to limit the pivotal movement of the lever 4 in the counterclockwise direction, as seen in FIG. 1. A switch 9 is mounted on the front wall of the tank 1 in such a position that it will be actuated by the counterweight 4a under circumstances to be set forth below.

Figure 8:
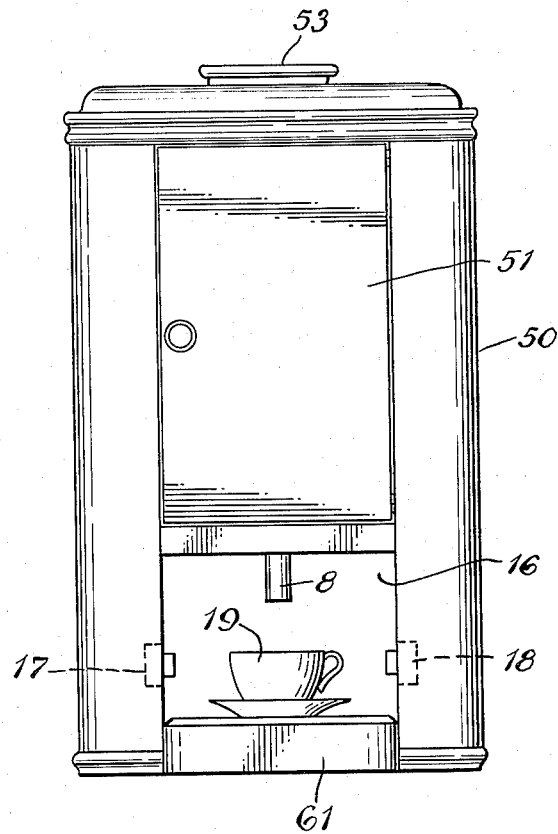
FIG. 8 shows a front elevation view of another modification of the coffee machine.

An outlet pipe 60 extends from the interior of the water tank 1 and is connected with a solenoid operated valve 6 mounted on the front wall of the water tank. From the valve 6 a conduit leads into a discharge tube 8 disposed above a base 61 which forms the bottom of the recess 16 (FIG. 8) and serves as support for a coffee receptacle, such as a coffee cup 19 (FIG. 8). A tube 62 connects the bottom part of the container 2 with the interior of the discharge tube 8 and is provided with a solenoid operated valve 7. An electronic timing device 3 is also mounted on the front wall of the tank 1. The structure and operation of said timing device 3 will be described below.

Figure 3:
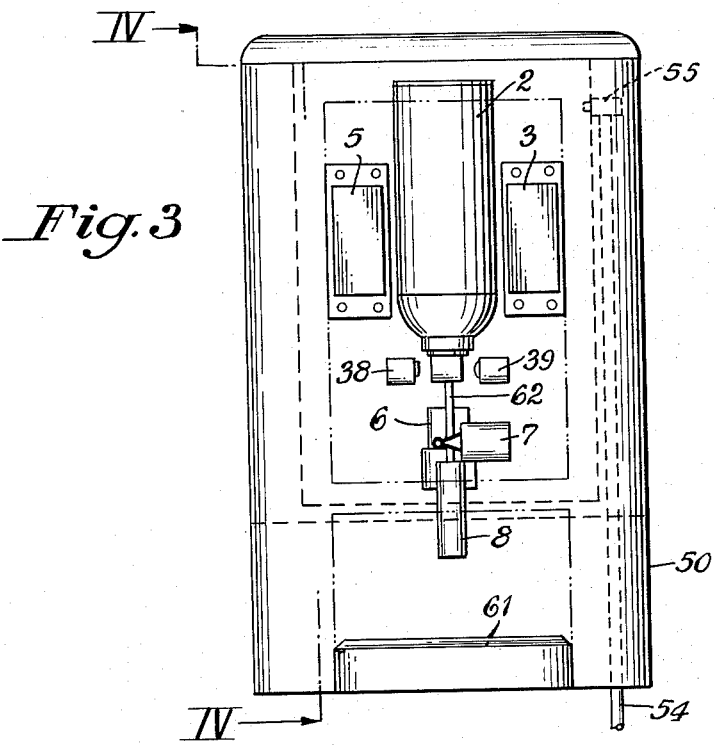
FIG. 3 shows a modified coffee machine.
Figure 4:
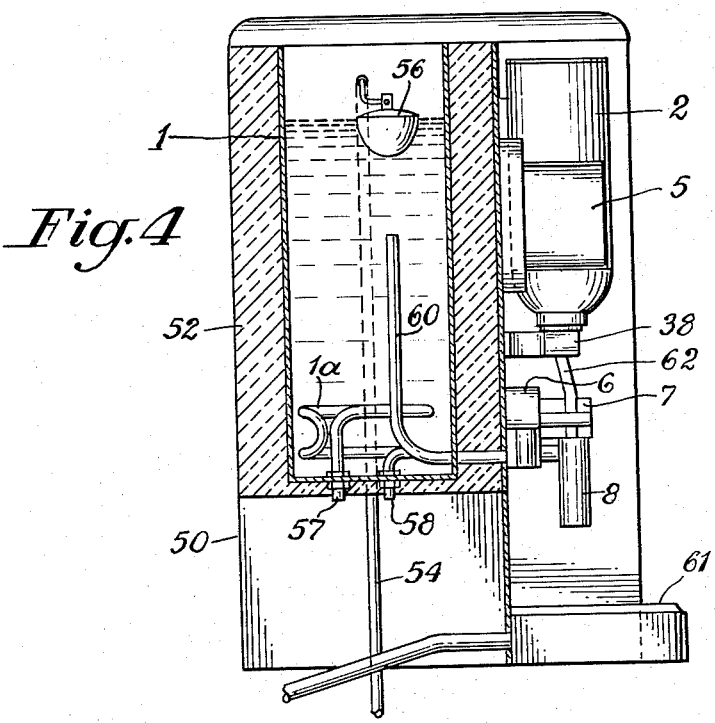
FIG. 4 shows a sectional view along the line IV—IV of FIG. 3.

In the embodiments of FIGS. 3, 4, 6, and 8 the lever 4 of FIG. 1 is omitted and the container 2 is removably supported on the front wall of the water tank 1 in any suitable manner. Also supported on said front wall are a photoelectric cell 39 and a light source 38 for cooperation therewith, as will be described. The photoelectric cell 39 is electrically connected with an electronic device 5 which is also mounted on said front wall of the water tank as shown in FIGS. 3, 4, and 6. Said electrical connection will be described in detail below.

Figure 7:
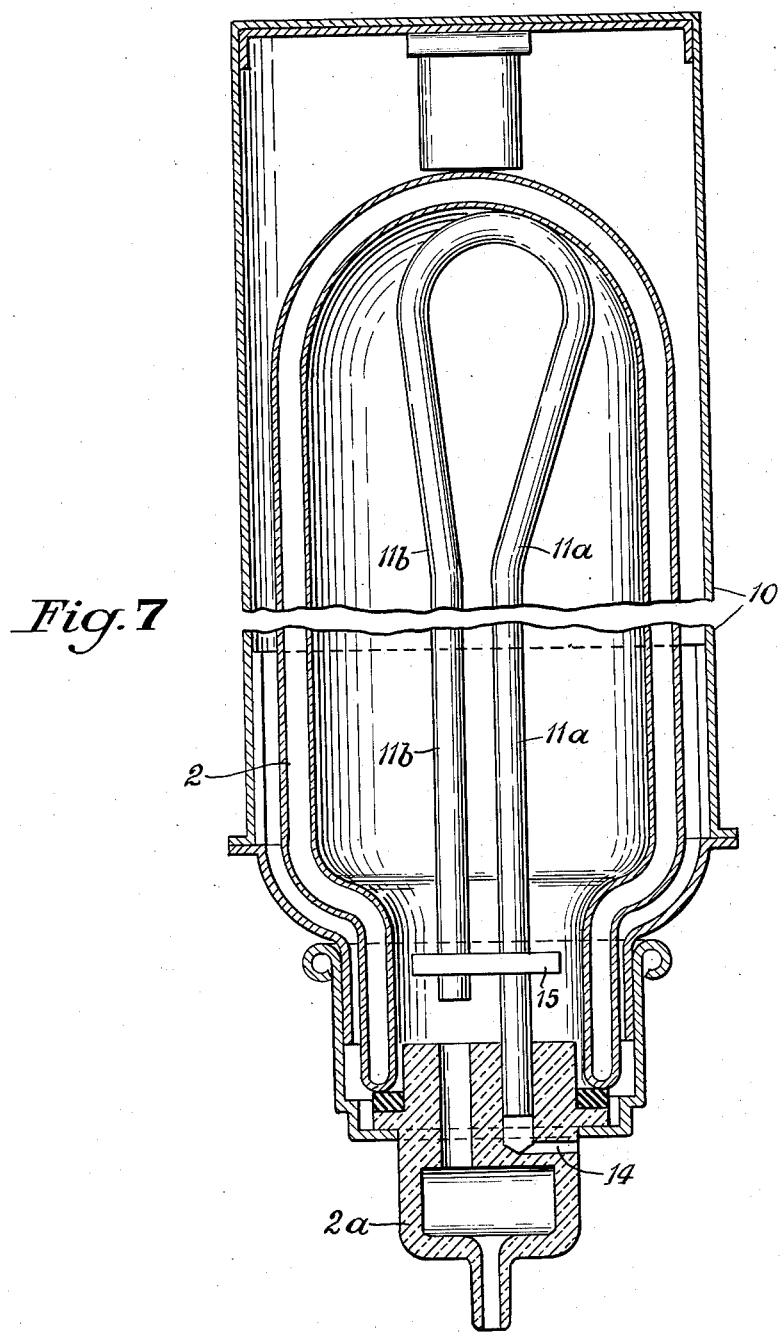
FIG. 7 shows a cross-sectional view through a thermos bottle at an enlarged scale.

In all three embodiments, the insulated concentrate container preferably has the form of a thermos bottle 2 arranged upside down in a casing 10 as shown in FIG. 7. The downwardly extending neck of the bottle 2 is closed by a stopper 2a. One leg 11a of a U-shaped tube placed within the bottle is attached to this stopper, while the other leg 11b terminates in the bottle 2 above the stopper 2a. The end of the leg 11a is connected to a venting channel 14 in the stopper 2a, so that the air path for compensation of the vacuum produced in the container by discharge of the liquid will always have the same length from entrance into the channel 14 to the discharge end of the leg 11b of the U-shaped tube.

This feature is important because the venting conditions will then be always unchanged in the container regardless of the amount of liquid in the thermos bottle.

Since chemically untreated concentrates are apt to form more or less sediments, it is possible that the lower open end of the tube leg 11b may become clogged or that the sediments may reach the following measuring devices and produce in the latter technical difficulties.

In order to prevent the colloidal suspended materials from reaching the mentioned danger zones the present invention provides a screen above the stopper 2a and extending around the two legs of the U-shaped tube 11a and 11b. The screen may, for instance, be in form of a disc or plate 15, the perimeter of which forms together with the inner wall of the neck of the thermos bottle 2 an annular space.

In actual practice it was discovered that the sediments do not only precipitate on the upper surface of the plate 15 but also on the lower surface when the plate is made of a plastic material (Plexiglas). This feature can be explained by the fact that the screen 15 is exposed to a potential difference, so that a small electric current, produced by the natural acidic contents of the concentrate, will produce the migration of the colloidal suspended particles so that the same will precipitate primarily on the Plexiglas screen 15.

In the embodiment of FIG. 8, a photoelectric cell 17 and a light source 18 are provided at opposite sides of the recess 16 in such a position that a coffee cup 19 placed on the base 61 prevents a light beam from the light source 18 to reach the photoelectric cell 17. The photoelectric cell 17 is electrically connected with an electronic device 20, FIG. 9 (not shown in FIG. 8), which is mounted on the front wall of the water tank 1 in any suitable position.

The circuitry and operation of the coffee machine will now be described with reference particularly to FIG. 9 which relates primarily to the embodiment of FIG. 8.

The electronic time switch 3 comprises a condenser 32 which forms part of a stabilizing unit 31, 32, 33, 34 in the starter anode circuit of a cold cathode tube 22a. This stabilizing unit is connected with a rotary disc resistance 35 and a trimmer 37. The anode circuit of the tube 22a includes a relay A1 for operation of switches 23', 36', 70, and 71. The circuit also includes a two-way rectifier 30 connected at 28 to a power line 72 and at 29 to a line 73 which is connectible to the other power line 74 as will be explained. The stabilizer 31 serves the purpose of stabilizing the direct current produced by the rectifier 30. The switch 23' is connected over a line 75 and the solenoid coils 26, 27 of the solenoid valves 6, 7 to the power line 72.

The line 73 is connected to the switch 36" in the switch 5 as shown, and one of the contacts in said switch 36" is connected by line 76 to the switch 23' in the electronic time switch 3 as shown. The switch 23" for the electronic switch 5 is connected over a line 77 to the power line 74, and said power line 74 is connected at 29 with the two-way rectifier 30 which is common to the three electronic switches 5, 3, 20 and is connected with the other power line 72 at 28.

The electronic circuit 5 includes a cold cathode tube 22b and a relay A2 for switches 23", 36", and 78 and is connected, as shown to the photoelectric cell 39. A signal lamp 40 is connected between the switch 23" and the power line 72 as shown, and the light source 38 is connected to power lines 72, 74 over a transformer 41.

The electronic circuit 20 is organized in the same manner as circuit 5 and includes the cold cathode tube 22, relay A, and switch 79. The switch 23 is connected over a master switch 42 to line 73 and over line 80 to the power line 74. The switch 36 is connected over lines 81, 82 to the stabilizing circuit in the electronic time switch 3 as shown. The photoelectric cell 18 is connected with the electronic switch 20 as shown.

Figure 9:
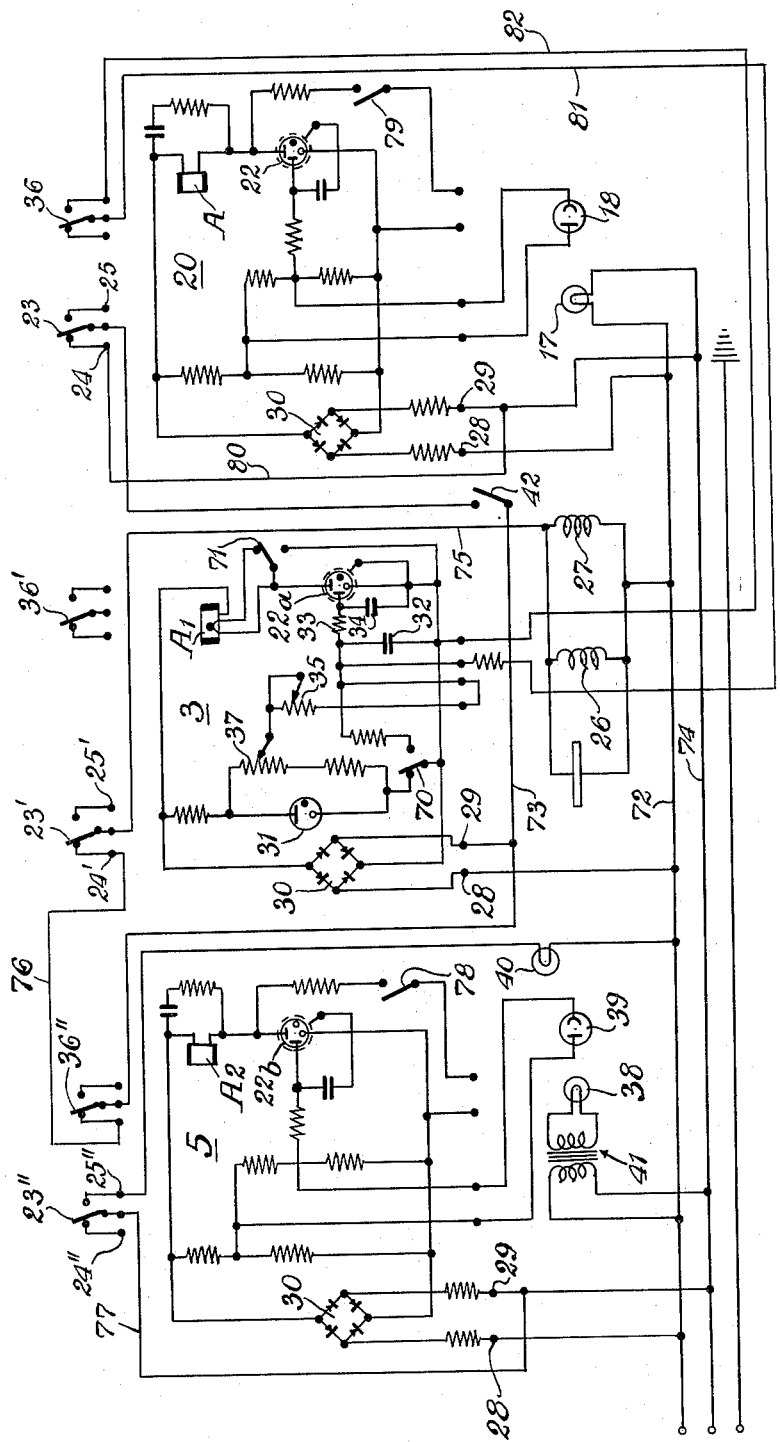
FIG. 9 shows a circuit diagram of the electrical devices employed primarily in the modification shown in FIG. 8.

When the master switch 42 is closed, the coffee machine is in operational condition and the switches 23, 36, and 79 are all in the position opposite to the position shown in FIG. 9, i.e. in their righthand position where switch 23 is open and switches 36 and 79 are closed. When the light beam from photocell 17 is interrupted by insertion of a coffee cup 19 on the base 61, the tube 22 is extinguished, the relay A becomes inoperative, and the three switches 23, 36, 79 move to the positions shown in FIG. 9.

Over line 73, switch 36", line 76, switch 23', and line 75 the solenoids 26, 27 are excited and cause the valves 6, 7 to open to discharge hot water and liquid coffee concentrate into the discharge tube 8 and hence coffee into the cup 19. Simultaneously, the stabilizing circuit in the electronic time switch 3 becomes active and imposes a charge voltage on the condenser 32 over the resistors 35, 37 until after the predetermined time the tube 22a ignites and causes the relay to change the positions of the switches 23', 36', 70, 71. Obviously, the breaking of the connection between contacts 23' and 24' causes the solenoids 26, 27 to become deenergized and the valves 6, 7 close. The complete unloading of the condenser 32 which is initiated by the shifting of switch 70, is very important and the simultaneous short-circuiting of the condenser circuit by the switch 36 over lines 80, 81 serves to ensure such complete unloading. Naturally, the amount of coffee discharged is adjustable by means of the resistors 35, 37.

As long as the stopper 2a of the thermos 2 is filled with the dark-colored liquid coffee concentrate, the electronic switch 5 is inactive. However, when there is no coffee concentrate in said stopper 2a, the light beam from the source 38 reaches the photocell 39 which causes the tube 22b to ignite and thereby the relay A2 to close switches 23" and 78 and to open switch 36". Obviously, this means that the "empty" signal lamp 40 is lighted and the solenoids 26, 27 are deenergized so that the valves 6, 7 close. The electronic switch 3 is apparently made inactive at the same time, and even if a coffee cup is in position or is inserted on the base 61, no discharge from the tube 8 occurs.

It should be obvious from this description that in the embodiments of FIGS. 1 and 3 the electronic switch 20 is omitted and the switches 23, 36 are replaced with a manually or coin operated switch (not shown). If desired, the electronic switch 20 could, of course, be retained and the photoelectric device 17, 18 replaced with the manually or coin operated switch.

In the embodiment of FIG. 1, the electronic switch 5 is also omitted and replaced with the lever and switch arrangement 4, 9 wherein the switch 9 corresponds to the switches 23″, 36″.

I claim:

In an automatic coffee machine, a hot water tank, a liquid coffee concentrate container adjacent to said tank, separate electromagnetic valve means connected with said hot water tank and said concentrate container to control the discharge therefrom, electronic timing means connected with said electromagnetic valve means, a cup stand, first light sensitive resistance means adjacent to said cup stand and adapted to be controlled according to the presence or absence of a cup on said cup stand, empty-indication means associated with said liquid coffee concentrate container, second light sensitive resistance means adjacent to said liquid coffee concentrate container and adapted to be controlled according to the emptiness or non-emptiness of said liquid coffee concentrate container, first electronic switch means connecting said electronic timing means with said first light sensitive resistance means, second electronic switch means connecting said electronic timing means with said second light sensitive resistance means, and stabilizing circuit means in said electronic timing means including a stabilizer tube, a condenser, and adjustable resistance means, whereby said first light sensitive resistance means causes opening of said electromagnetic valve means and energization of said stabilizing circuit means to charge said condenser when a cup is placed on said cup stand unless said second electronic switch means is in its empty-indication condition, said electronic timing means and said first and second electronic switch means each including a cold cathode electronic tube, and said electromagnetic valve means being instantly closed when said cold cathode electronic tube in the electronic timing means ignites following the charging of said condenser during a predetermined period of time as accurately controlled by the setting of said adjustable resistance means.

References Cited in the file of this patent
UNITED STATES PATENTS

| | | |
|---|---|---|
| 1,936,522 | Pearson | Nov. 21, 1933 |
| 2,361,837 | Gilmore | Oct. 31, 1944 |
| 2,381,505 | Lindholm | Aug. 7, 1945 |
| 2,502,844 | Hildreth | Apr. 4, 1950 |
| 2,526,191 | Barker | Oct. 17, 1950 |
| 2,626,558 | Stein | Jan. 27, 1953 |
| 2,663,477 | Bendz | Dec. 22, 1953 |
| 2,682,984 | Melekian et al. | July 6, 1954 |
| 2,701,621 | Sprague | Feb. 8, 1955 |
| 2,780,009 | Stickel | Feb. 5, 1957 |
| 2,802,599 | Callahan et al. | Aug. 13, 1957 |
| 2,827,927 | Findlay | Mar. 25, 1958 |
| 2,830,528 | Arnett | Apr. 15, 1958 |
| 2,839,688 | Anton | June 17, 1958 |
| 2,844,214 | Hall et al. | July 22, 1958 |
| 2,848,140 | Gabrielsen | Aug. 19, 1958 |

FOREIGN PATENTS

| | | |
|---|---|---|
| 400,672 | Great Britain | Nov. 2, 1933 |